United States Patent [19]

Stroud

[11] Patent Number: 5,083,006

[45] Date of Patent: Jan. 21, 1992

[54] LASER DRILLING OF COMPONENTS

[75] Inventor: David Stroud, Bristol, England

[73] Assignee: Rolls-Royce plc, London, England

[21] Appl. No.: 660,049

[22] Filed: Feb. 25, 1991

[30] Foreign Application Priority Data

Mar. 2, 1990 [GB] United Kingdom ............... 9004798

[51] Int. Cl.[5] .............................................. B23K 26/00
[52] U.S. Cl. ............................. 219/121.71; 219/121.7;
219/121.84
[58] Field of Search ............ 219/121.7, 121.71, 121.84

[56] References Cited

U.S. PATENT DOCUMENTS 5,026,964 6/1991 Somers et al. ................. 219/121.7

FOREIGN PATENT DOCUMENTS 0250892 12/1985 Japan ............................... 219/121.7
0230286 9/1988 Japan ............................. 219/121.71
2045970 11/1980 United Kingdom .
2063523 6/1981 United Kingdom .
2164174 3/1986 United Kingdom .

Primary Examiner—C. L. Albritton
Attorney, Agent, or Firm—Oliff & Berridge

[57] ABSTRACT

In the laser drilling of gas turbine engine blades there is provided a method of maintaining constant the distance between a laser nozzle and the surface to be drilled by measuring the topography of the surface and using that data to control the focusing of the laser beam onto the surface. The topography is measured by determining the back pressure of a stream of oxygen blown through the nozzle onto the surface, and relating the back pressure to the distance between the nozzle and the surface. The distance measured is used to control a servo operated table so as to move the surface to the optimum distance from the nozzle.

4 Claims, 1 Drawing Sheet

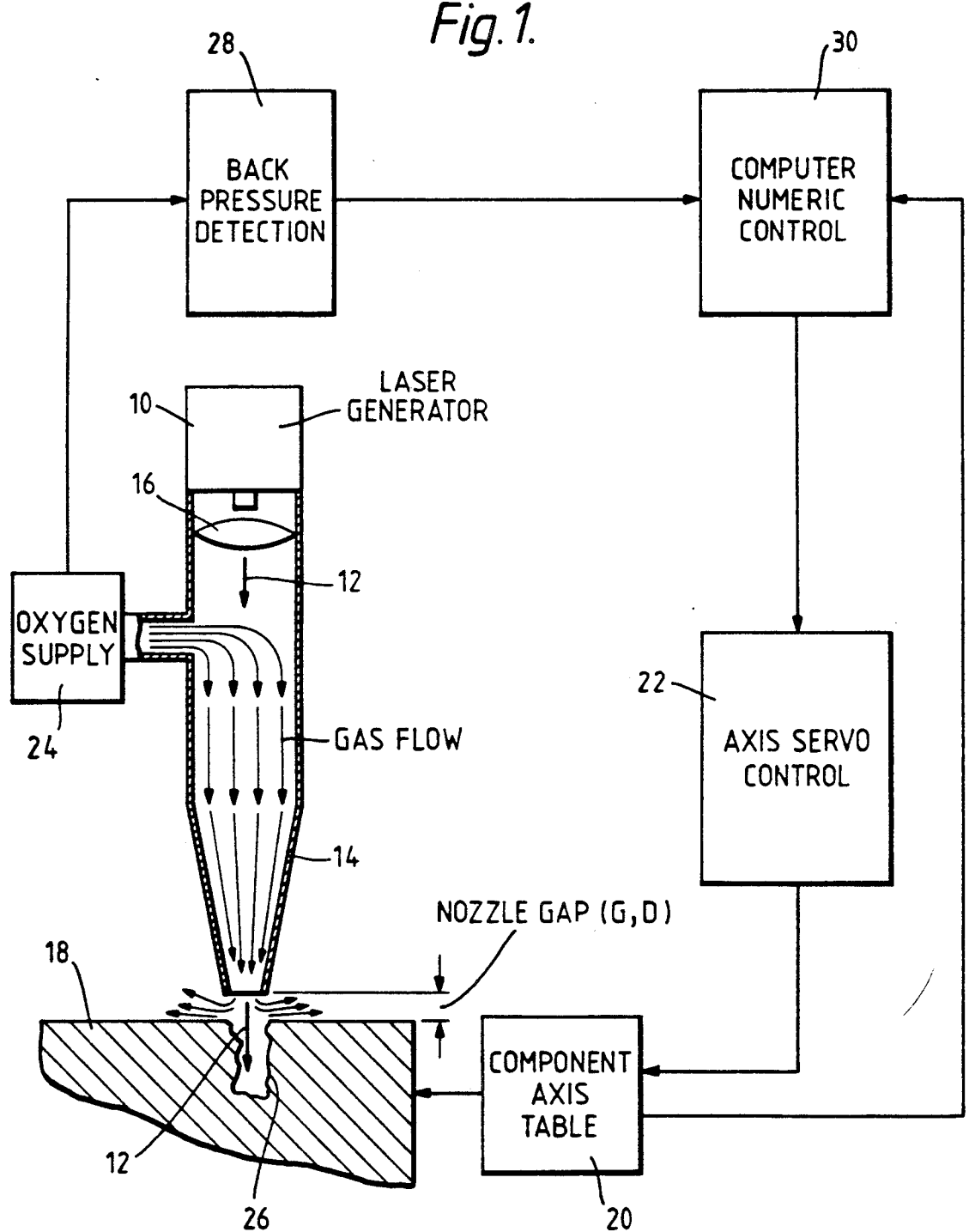

LASER DRILLING OF COMPONENTS

BACKGROUND OF THE INVENTION

This invention concerns improvements in or relating to laser drilling of components.

The performance of a gas turbine engine depends in part on its operating temperature. The quest for improved aircraft gas turbine engine performance now results in very high temperature gas streams within the engine. Gas stream temperatures may exceed the melting point of a component such as a turbine blade working within the gas stream.

Clearly, the component must be kept as cool as possible, and one way of achieving this is to provide a flow of cooling air over the surface of the component through holes in the surface communicating with a cold air supply within the component.

The shape, size and disposition of the cooling holes are of paramount importance for efficient cooling, and one way of providing holes of required accuracy is by laser drilling.

Laser drilling of a metal alloy turbine blade is done by directing through a nozzle at the blade a laser beam focused through a lens assembly, together with a high pressure oxygen supply. It is important that the distance between the nozzle and the surface of the blade is kept constant, otherwise the focusing of the laser beam on the blade will be adversely affected and the quality of the hole being drilled will suffer.

It is an object of the present invention to provide a method of maintaining constant the distance between the laser nozzle and the surface of the component being drilled over a region of the surface.

SUMMARY OF THE INVENTION

In general, the method involves measuring the topography of the surface to be drilled and subsequently using data thereby acquired to control the focusing of the laser beam onto the surface during the drilling operation.

According to the present invention there is provided a method of drilling a plurality of holes in a surface of a component using a laser beam and means for focusing the beam through a nozzle onto the surface of the component, the method comprising the steps of, (a) setting a nominal gap G between the nozzle and the surface to be drilled, at a zero datum point on the surface, (b) for each point of the surface where a hole is to be drilled,
 (i) locating the nozzle over the point,
 (ii) measuring the distance D between the nozzle and the point,
 (iii) computing an offset G-D for the point,
 (iv) storing the location of the point and its associated offset G-D in a data storage and retrieval system, (c) for each point to be drilled,
 (i) locating the nozzle over the point,
 (ii) retrieving from the data storage and retrieval system the offset G-D associated with the point,
 (iii) moving the component in relation to the focusing means through a distance equal to the offset G-D until the distance of the nozzle from the point is G,
 (iv) activating the laser beam to drill a hole in the component at the point.

Preferably the distance D in step (b)(iii) is measured by determining the back pressure of a stream of pressurised gas applied under constant pressure through the nozzle onto the surface.

The pressurised gas is preferably oxygen used for the laser drilling operation (c)(iv).

BRIEF DESCRIPTION OF THE DRAWING

The invention will now be described by way of example only with reference to the apparatus shown in the accompanying schematic drawing (FIG. 1).

DESCRIPTION OF THE INVENTION

In FIG. 1 there is shown a generator 10 for generating a laser beam 12, a drilling nozzle 14 aligned with the laser beam, and a lens system 16 to focus the beam through the nozzle onto a metal component 18 to be drilled.

The component 18 is mounted for movement in a number of directions (X, Y, Z) on an axis table 20 which is controlled by a servo control mechanism 22.

A stream of pressurised oxygen is passed into the nozzle 14 from an oxygen supply 24 so that the oxygen flows out from the nozzle mouthpiece onto the surface of the component 18. In a known manner, the beam 12 and the oxygen interact to drill a hole 26 in the surface of the component 18.

The back pressure of the oxygen is measured by a back pressure detection unit 28 and the result is stored as necessary in a computer numeric control unit 30 which incorporates a data storage and retrieval system.

Initially, the apparatus is used to measure the topography of the component (typically a gas turbine engine blade) in the vicinity of the holes to be drilled. In particular, the distance of the surface of the component 18 from the nozzle 14 is measured at each location where the component is to be drilled. At a zero datum point on the component 18 the gap between the nozzle 14 and the surface of the component will be set at a nominal operating distance G. Typically, for drilling a gas turbine blade G will be about 0.1 mm.

The component 18 is then rotated on its table 20 so that the position of a hole to be drilled comes under the nozzle 14. The position of the hole is fed back to the numeric control unit 30 where it is stored as a set of data. Simultaneously, oxygen under constant pressure is passed through the nozzle 14 onto the surface of the component. Because of the proximity of the surface to the nozzle a back pressure in the oxygen flow will be measured by the back pressure detection unit 28 and transmitted to the computer numeric control unit 30. The apparatus will have previously been calibrated to provide a functional relationship between back pressure and distance between nozzle and surface, this relationship being stored as a look-up table or as a formula in the numeric control unit 30. The said relationship is now used to convert the measured back pressure to a distance D between the nozzle and the surface. The offset G-D is then computed and stored in the control unit 30 is association with the data previously stored in respect of the location of the hole.

The above procedure is then repeated for the position of each hole to be drilled.

The component is then positioned by its table 20 so that the position of the first hole is located under the nozzle 14. The data characteristics of the position of the hole are then located in the control unit 30 and the associated offset G-D is sent to the axis servo control unit 22. The axis servo control unit 22 moves the component 18 towards or away from the nozzle 14 in accordance with the offset G-D until the distance between the nozzle and the surface of the component is G. The drilling of a hole at that location on the surface of the component then proceeds by means of the laser beam and the pressurised oxygen in a manner known in the art.

The procedure in the preceding paragraph is then repeated at the location of each hole to be drilled.

The invention enables each hole to be drilled at the optimum distance between the nozzle and the component surface, which distance is determined by the focusing of the laser beam.

In another embodiment, not shown, the laser drilling apparatus may instead be moved with respect to a stationary component.

I claim:

1. A method of drilling a plurality of holes in a surface of a component using a laser beam and means for focusing the beam through a nozzle onto the surface of the component, the method comprising the steps of,
   (a) setting a nominal gap G between the nozzle and the surface to be drilled, at a zero datum point on the surface,
   (b) for each point of the surface where a hole is to be drilled,
      (i) locating the nozzle over the point,
      (ii) measuring the distance D between the nozzle and the point,
      (iii) computing an offset G-D for the point,
      (iv) storing the location of the point and its associated offset G-D in a data storage and retrieval system,
   (c) for each point to be drilled,
      (i) locating the nozzle over the point,
      (ii) retrieving from the data storage and retrieval system the offset G-D associated with the point,
      (iii) moving the component in relation to the focusing means through a distance equal to the offset G-D until the distance of the nozzle from the point is G,
      (iv) activating the laser beam to drill a hole in the component at the point.

2. A method as claimed in claim 1 wherein the distance D in step (b)(ii) is measured by determining the back pressure of a stream of pressurised gas applied under constant pressure through the nozzle onto the surface.

3. A method as claimed in claim 2 wherein the pressurised gas is oxygen used for the laser drilling operation (c)(iv) in claim 1.

4. A method as claimed in claim 2 including a preliminary step of determining a relationship between the back pressure and D and storing the relationship in the data storage and retrieval system as a look-up table or as a formula.

* * * * *